United States Patent

[11] 3,568,580

[72] Inventor Louis M. Moyroud
Medford, Mass. (c/o Photon, Inc., 355 Middlesex Ave., Wilmington, Mass.01887)
[21] Appl. No. 697,203
[22] Filed Jan. 11, 1968
[45] Patented Mar. 9, 1971
[32] Priority Jan. 13, 1967
[33] Great Britain
[31] 2065/67

[54] PHOTOTYPESETTING MACHINES
4 Claims, 8 Drawing Figs.

[52] U.S. Cl. ........ 95/4.5
[51] Int. Cl. ........ B41b 21/24
[50] Field of Search ........ 95/4.5

[56] References Cited
UNITED STATES PATENTS
3,134,090 5/1964 Blakely ........ 95/4.5
3,291,015 12/1966 Moyroud ........ 95/4.5

*Primary Examiner*—John M. Horan
*Attorney*—Richard F. Bannasch

ABSTRACT: This invention pertains to a character projection system in a photographic type composing machine. It comprises a moving character matrix which causes characters to pass serially through a projection field. As each character reaches its assigned projection position within the projection field it is illuminated by means of a novel illumination system. The illumination system consists more than one illuminating modules which are controlled by an electronic control circuit. Each illuminating module is comprised basically of a flash lamp and a mirror whose deflection is precisely controlled by the electronic control circuit to direct the light from the flash tube to illuminate a character precisely in its assigned projection position.

*INVENTOR.*
LOUIS M. MOYROUD

146

| WIDTH | 148 | 150 RANK VALUE | 152 ACCUM. WIDTH | 154 FLASH VALUE | 156 FLASH SEQ. | 158 MATRIX CYCLES |
|---|---|---|---|---|---|---|
| 5 | l | 520 | 5 | 570 | 1 | FIRST |
| 5 | i | 360 | 10 | 370 | 2 | SECOND |
| 10 | n | 640 | 20 | 660 | 3 | |
| 8 | e | 160 | 28 | 188 | | |
| | | 320 | 28 | 348 | | |
| | | 560 | 28 | 588 | | |
| | | 760 | 28 | 788 | 4 | |
| | | 960 | 28 | 988 | | THIRD |
| 9 | o | 680 | 47* | 727 | 5 | |
| 6 | f | 200 | 53 | 253 | 6 | FOURTH |
| 7 | t | 480 | 70* | 550 | 7 | |
| | | 920 | 70 | 990 | | |
| 8 | e | 160 | 78 | 238 | | |
| | | 320 | 78 | 398 | | |
| | | 560 | 78 | 638 | 8 | |
| | | 760 | 78 | 838 | | |
| | | 960 | 78 | 938 | | |
| 10 | x | 1120 | 88 | 1208 | 9 | |
| 6 | t | 480 | 96 | 576 | 10 | FIFTH |
| | | 920 | 96 | 1016 | | |

* INCLUDING 10-UNIT WORD SPACE 142 144

| CHAR. | RANK VALUE |
|---|---|
| a | zero |
| b | 40 |
| c | 80 |
| d | 120 |
| e | 160 |
| f | 200 |
| g | 240 |
| h | 280 |
| e | 320 |
| i | 360 |
| j | 400 |
| k | 440 |
| t | 480 |
| l | 520 |
| e | 560 |
| m | 600 |
| n | 640 |
| o | 680 |
| p | 720 |
| e | 760 |
| q | 800 |
| r | 840 |
| s | 880 |
| t | 920 |
| e | 960 |
| u | 1000 |
| v | 1040 |
| w | 1080 |
| x | 1120 |
| y | 1160 |
| z | 1200 |

*INVENTOR.*
LOUIS M. MOYROUD

INVENTOR
LOUIS M. MOYROUD

Richard F. Bammasch
ATTORNEY

PHOTOTYPESETTING MACHINES

BACKGROUND OF THE INVENTION

This invention is related to our U.S. Pat. No. 3,291,015 where we described a phototypesetter which passes characters serially through a projection area. Flash illumination means are provided which illuminate the entire projection area. In order to limit the projection to only one character at a time a moving light patch forming mechanism is used. As each character is projected in the composition of a line the mechanism is advanced so that the light patch is in position to project the next character in the line when it reaches its assigned projection position. The characters are projected one at a time, in the same sequence in which they appear in the line. The production speed of the machine is limited by the fact that no character can be flashed except the one following the last character flashed. Thus a full passage of all of the characters of the alphabet may take place without any character projection because the next character to be flashed is located at the end of this alphabet.

This problem has been eliminated in the system described in patent application Ser. No. 506,936. In this system the same basic matrix is utilized, but a cathode ray tube is used as illuminating means. In addition means are provided to produce a whole line one in one revolution of the matrix. The electronic control circuit is effective to form a light patch on the face of the CRT at the assigned position within the projection area and at the precise moment when the character to be projected is in the assigned position. Thus the light patch for illuminating the character to be projected is positioned electronically by deflection on the electron beam within the cathode ray tube rather than mechanically as is done in U.S. Pat. No. 3,291,015 thereby allowing much higher character projection speeds. In this system, however, the speed of the matrix has to be considerably reduced because of the unavailability at the present time of cathode ray tubes with phosphors of great actinic value and very short decay time.

SUMMARY OF THE INVENTION

In the present invention we are dealing with a phototypesetter which causes characters to pass in succession through a projection zone. However, in order to illuminate characters at a precise instant in a preselected location in the projection zone a plurality of flash tubes are associated with a plurality of deflectable mirrors. Each mirror is very similar to the deflectable mirrors used in a galvanometer. The mirrors are deflected on command from the control circuit so that when the flash tube is flashed a patch of light is projected to the exact position in the projection zone from which the character is to be projected. By using a plurality of beam deflecting projection mechanisms (represented by mirrors and their controls) a considerably higher effective speed can be achieved than in the system described in U.S. Pat. No. 3,291,015. In the machine described in the present application each projection mechanism is individually controlled by the control circuit in such a way that characters are generally not projected in the sequence in which they appear in the line. Thus, if a a particular projection mechanism has to wait for a full alphabet sweep before it can illuminate the character that has been assigned to it, the other projection mechanism will, in the meantime, project other characters as they go by. This is a major improvement on U.S. Pat. No. 3,291,015 as the speed of the basic machine, at the cost of a relatively minor addition, can be considerably increased.

One object of this invention is to replace the mechanical window described in my U.S. Pat. No. 3,291,015 by a basically nonmechanical system capable of moving the "light patch" at a greater speed from character position to character position and to return said patch to origin in a time interval considerably inferior to the return time of said window.

Another object of this invention is to provide an improved light patch forming means, including a plurality of light sources, to greatly increase the productivity of the machine.

Another object of this invention is to provide means for accessing the most appropriate of like characters repeated along the matrix in view of obtaining high speed.

DESCRIPTION OF THE PREFERRED EMBODIMENTS

Figure 1:
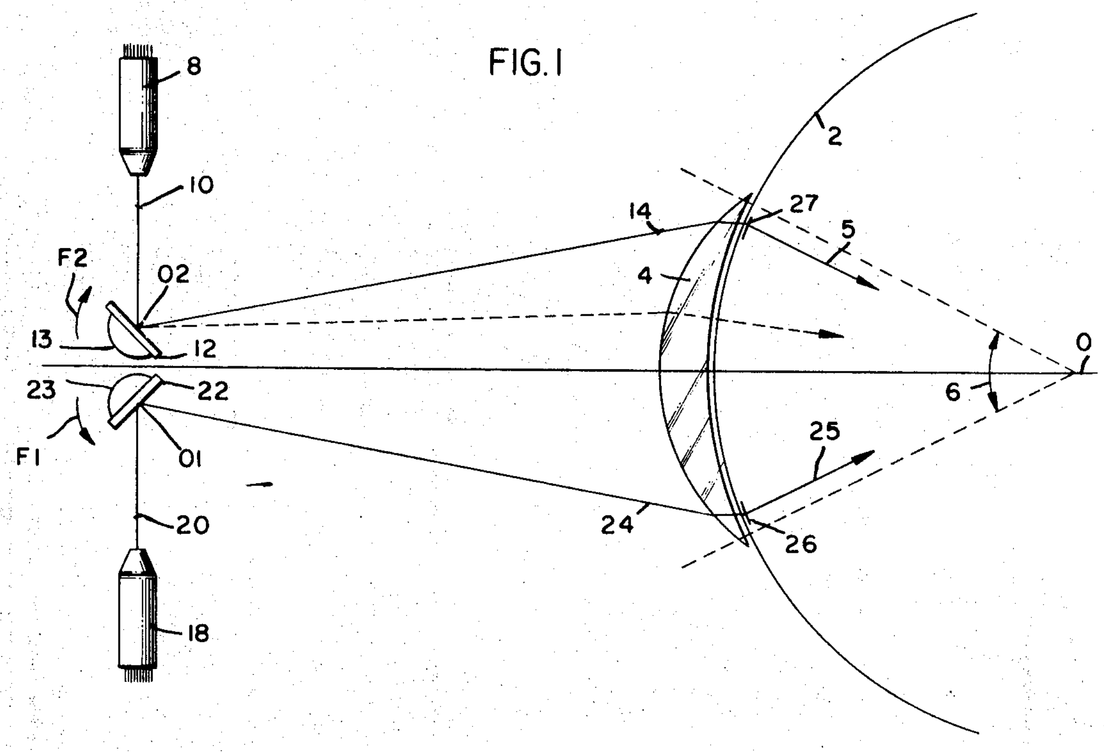
FIG. 1 is a partial schematic view showing the matrix carrier and a dual light patch projecting system.

With reference to FIG. 1, in a preferred embodiment the movable light patch is formed at locations such at 26 and 27 within the character projection area defined by the circumference of the character carrier 2 and the angle 6 by two illuminating modules. The illuminating module comprises a xenon flash tube and an optical projection system 8 preferably including an aperture proportional to the size of the illuminating patch. The light rays emerging along line 10 from the optical system are deflected (and refocused if necessary) by the mirror 12 of a galvanometer 13 from which they emerge along line 14. These rays are further deflected by an appropriate condensing system 4 to be directed toward the projection lens along path 5 not shown which can be identical to that described in copending application Ser. No. 617,912. The optical system comprised of projection unit 8, mirror 12 and condenser 4 is such as to project at 27 an image of the limiting aperture of projection unit 8 or of the light source itself if the latter is of such dimensions and definition as to produce an acceptable image on the matrix plane. Of course, the condensing unit 4 will not greatly affect the size or quality of the image 27 if, as shown, in the FIG., said condensing unit is adjacent to the matrix drum. The main purpose of condenser 4, which may be a flat field lens, is to direct emerging light toward the projection lens, not to form the light patch.

A second optical system 18 projects light along path 20 onto mirror 22 of galvanometer 23, said light after deflection, following a path 24 to create at 26 a light patch of reasonably good definition after passing through condensing unit 4 from which light emerges along path 25.

It is advantageous to have the galvanometer mirrors as close to each other as possible in order to concentrate the light emerging from the matrix in the projection lens area.

The position of the two galvanometers of FIG. 1 is shown at "zero," for example at the beginning of a line. In this position the path 24 to be followed by light produced by projection unit 18 and deflected by galvanometer 23 is such that the light patch created at 26 will be used to illuminate the first character of the line (generally after having been deflected by a value proportional to the width of this character). On the other hand, patch 27 corresponding to projection unit 8 and galvanometer 13 occupies the position on the matrix corresponding to the last character of the longest line that can be produced. As the line is being composed, galvanometer 23 is deflected step by step in direction shown by arrow F1 to successively illuminate the first, second, third etc. characters of the line. Galvanometer 13 is deflected in direction shown by arrow F2 to successively illuminate the last character of the line, then the one before that etc.

It is thus clear that, in the system described in relation with FIG. 1, a line of text can be produced approximately twice as fast as in the arrangement described in U.S. Pat. No. 368,839 as the composition proceeds from both ends simultaneously.

Figures 2, 3:
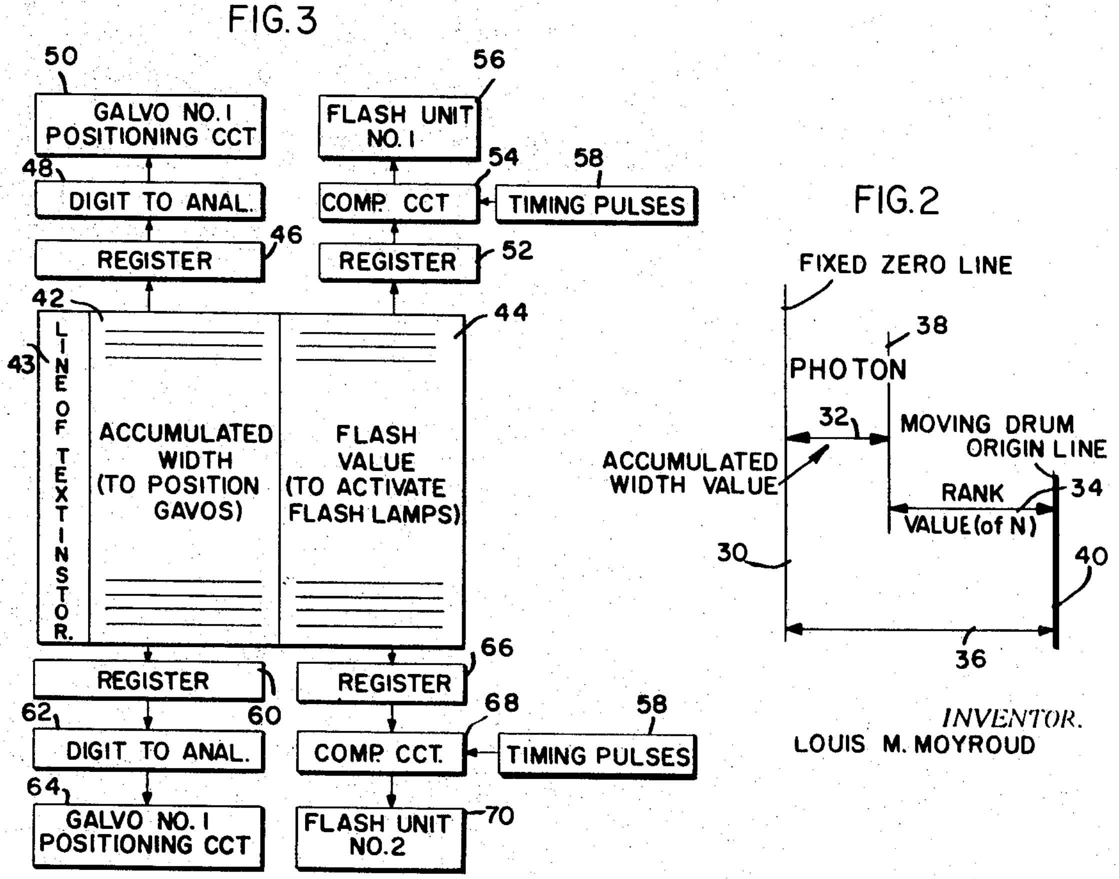
FIG. 2 is a diagram illustrating the composition of a line of text.
FIG. 3 is a diagram illustrating the control circuitry for the dual light patch projecting system.

Means to achieve this result are illustrated in FIGS. 2 and 3. FIG. 2 represents the signification of the terminology utilized in similar machines in U.S. Pat. No. 120,313 and 368,839 U.S. copending application Ser. No. 506,936. The left hand margin of the text to be composed is shown beginning at 30. "PHOTON" represents the line being composed. The accumulated width value of characters, shown at 32, represents the value of the accumulator in the electronic control circuit prior to the flashing of the last character of the line $N$. Line 38 represents the reference line of said character $N$ as defined in U.S. Pat. No. 120,313. Line 40 represents the "origin" line associated with the moving character matrix which generally coincides with line 30 at the beginning of each new cycle. The rank value (as defined in said patent) of the next character to be flashed is shown at 34. The displacement or flash value of said character is shown at 36.

As explained in said patent and copending applications, the line to be composed is stored in a memory as shown at 43 in FIG. 3. In section 42 of said memory the accumulated width of each character has been stored in the same order as these characters are entered. In another section 44 of the memory, the flash value of each character has also been stored so that the read command of the memory can cause the extraction from said memory of a character represented by its flash value and accumulated width value.

When, through appropriate circuitry not shown, the first character of the line is called for, said character's accumulated width is transferred to a register 46 at the same time as its flash value is transferred to a register 52. Likewise, the last character of the line has its accumulated width transferred to register 60 and its flash value to register 66. The information of register 46 is now transferred through a digital-to-analog circuit 48 to the positioning mechanism 50 of galvanometer 23 and, likewise, the information of register 60 is transferred through digital-to-analog circuit 62 to the positioning mechanism 64 of galvanometer 13. So, at this time, both galvanometers have been positioned at an angle depending on the width of the first character of the line for galvanometer 23 and on the total accumulated widths of the characters of the line for galvanometer 13. A circuit delay of the order of 1 millisecond allows this positioning to take place before a gate is open to let the timing pulses produced by circuit 58 in synchronism with the moving matrix are allowed to reach comparison circuits 54 (for first character) and 68 (for last character). These circuits compare the flash values of characters stored in register 52 and 66 respectively. When equality is detected by comparison circuit 54 the flash lamp of projection unit 18 is fired to project the first character of the line and the following character is immediately entered into registers 46 and 52 to deflect the galvanometer and place it in position to project the light patch at the location on the matrix corresponding to the second character of the line and to prepare the comparison circuit 54 for the accurate timing of the second firing of projection unit 18. Likewise, as soon as the last character of the line has been flashed by projection unit 8, the next character values are entered into registers 60 and 66 to project the characters of the line preceding the last one.

Figures 4, 7, 8:
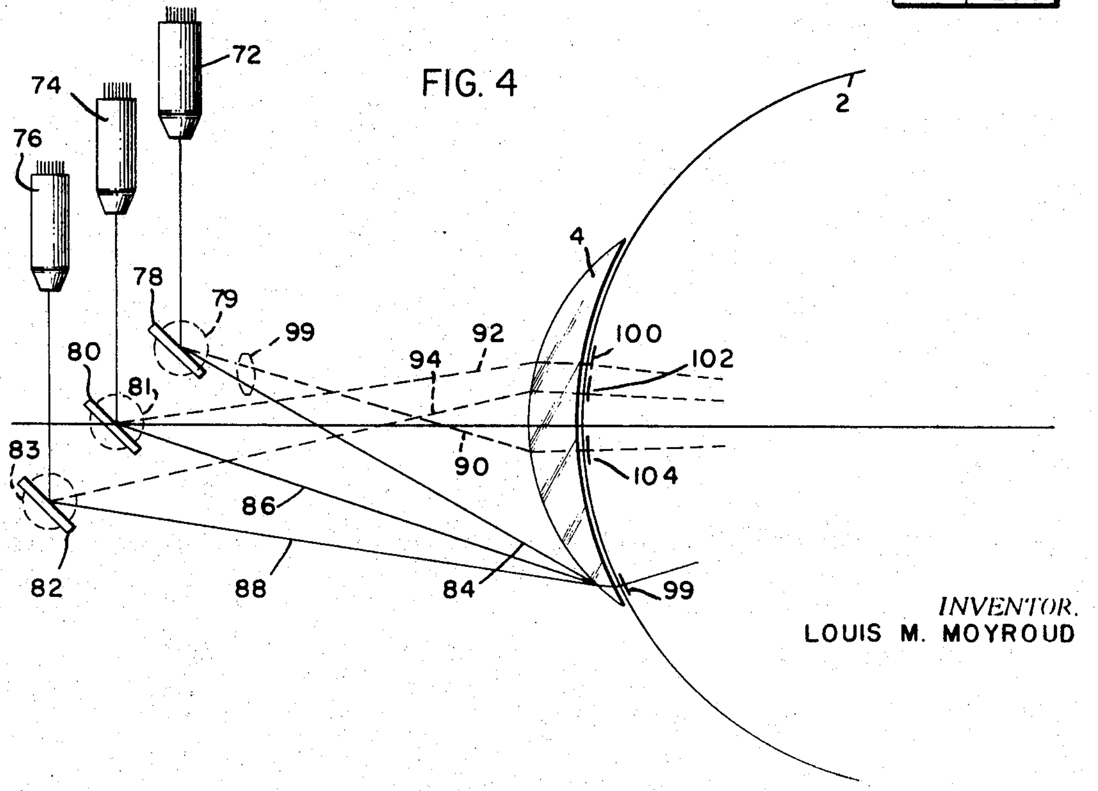
FIG. 4 on sheet 1 is an alternative embodiment showing the matrix carrier and a triple light patch projecting system.
FIG. 7 on sheet 2 is a table showing the rank value of the characters of the alphabet.
FIG. 8 on sheet 2 is a table showing the flashing sequence of a line of text.

The number of galvanometers does not have to be limited to two and an arrangement comprising three galvanometers and projection units is shown in FIG. 4 (on sheet 1). In this FIG., the projection units are shown at 72, 74 and 76, the galvanometer mirrors at 78, 80 and 82 and the galvanometers at 79, 81 and 83. The matrix drum (or band) is shown at 2 and the condensing lens system at 4.

At the beginning of a line, at position zero, the galvanometer mirrors, as shown, are positioned to direct their associated light patches at one common area 99 along paths 84, 86 and 88. As the line is being read out of storage, galvanometer 79 receives the accumulated width relative to the first character of the line and deflects its mirror 78 accordingly, galvanometer 81 deflects its mirror 80 in accordance with the accumulated width of the second character of the line and galvanometer 83 deflects its mirror 82 in accordance with the accumulated width of the third character of the line. Each projection unit and associated galvanometer operates as described in relation with the first example but, in the system described, the first unit to be flashed will immediately be prepared to flash the next character to be pulled out of storage.

It may happen, for example, that depending on the sequence of characters the third character of the line will be flashed before the first and second one. In this case the associated projection unit 76 will be immediately conditioned to flash the fourth character of the line. Thus, in this system, the characters of a line are not generally flashed in the same sequence as they appear. For example, at the end of a line the optical paths associated with each projection unit may have "crossed" each other and be located as shown at 90, 92 and 94 forming illuminating patches at 104, 102 and 100 respectively. The "first" unit 72 has been lagging behind the "second" unit 74 and the "third" unit 76.

In order to improve the effectiveness of the optical system, a lens such as 99 can be associated with each galvanometer. For example, each of these lens can be positioned at a distance equal to its focal length from the light source so that those parallel light bundles emerging from the lens will make an image of the light source in the focal plane of condensing unit 4 where the projection lens is approximately located. Some diffusing material located against the matrix or adjacent to the matrix plane can also be utilized to scatter the light emerging from the matrix to cover the area in which the projection lens is located.

Figure 5:
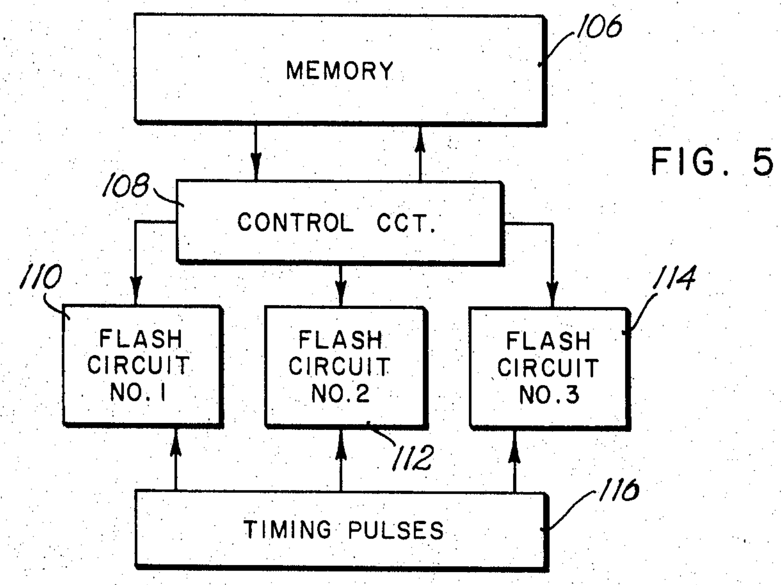
FIG. 5 on sheet 3 is a diagram illustrating the control circuit for the triple light patch projecting system.

FIG. 5 represents schematically the control circuit of the three-galvanometer system. The memory 106 is similar to memory 43 of FIG. 3. The timing pulses are produced by circuit 116. These are directed to individual flash circuits (comprising comparison circuits to time each flash unit) 110, 112 and 114 corresponding to projection units 72, 74 and 76 of FIG. 4. As soon as a flash has occurred, the affected flash circuit calls for the next character in storage through memory control circuits 108.

As explained in U.S. Pat. No. 368,839, the production speed of a machine of the class described can be increased by repeating the most frequently used letters of the alphabet a number of times proportional to the frequency of their occurrence in the language. In the simplified example of FIG. 7, the letter *e* has been repeated five times in the lower case alphabet and the letter *t* twice. The repeated letters can be scattered among other characters including upper case characters and even characters of a less frequently used typeface (for example italics) in order to increase the probability of having one of these repeated characters near the firing position at the time the circuit is ready for producing a flash.

Figure 6:
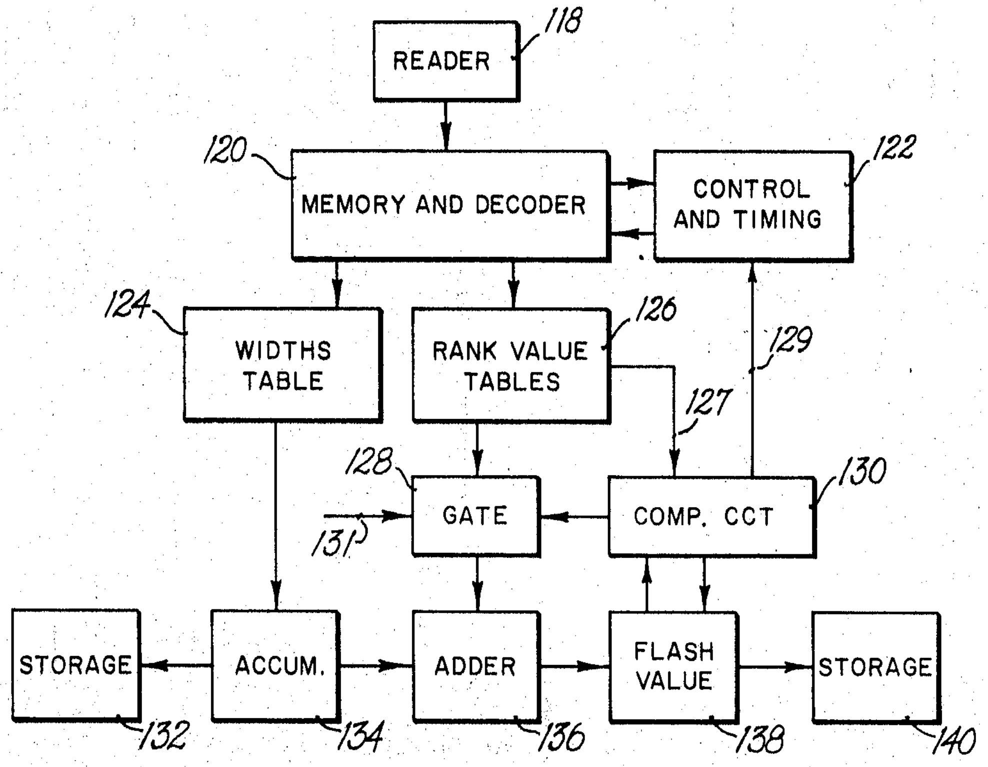
FIG. 6 is a diagram illustrating a portion of a control circuit for controlling the most advantageous flash sequence.

FIG. 6 represents schematically a circuit capable of preparing the most advantageous sequence of flashes in an alphabet with repeated characters. A magnetic or paper tape red reader shown at 118 transmits character information (identity codes) to a memory-decoder 120 controlled by timing input-output and addressing circuit 122. As explained in above identified patent and patent application and presently used in Photon "Textmaster 713" machines, a whole line is stored for purposes of justification before any character is photographed. As each character is entered into decoder 120, its width is transferred from width table 124 to width accumulator 134 and to storage 132 which keeps track of the accumulated width value associated with each character. The rank of each character is also transferred from rank table 126 through gate 128 to adder 136 in order to add width and rank value to obtain the flash value stored in storage 140 for each and every character. The case of repeated characters will now be considered. As a given character is decoded, its associated rank value is transferred by wires 127 to a comparison circuit 130, gate 128 being closed. If the flash value of the latest character stored in block 140, presently in register 138 is greater than the rank value of the just entered character. The memory control 122 is energized through wires 129 to scan the rank table in the order of increasing values until another rank value for the same character has been found which exceeds the value of register 138. At this time the comparison circuits clear register 138 and opens gate 128 in order to transfer the rank value of said character to adder 136, register 138 and storage 140. If, however, no rank value of for the selected character has been found at the end of the scanning of the rank table, the scanning is started again (through circuits not shown) and the first rank value of the selected character is entered into adder 136 after gate 128 has been disabled by a pulse generated at the end of the scanning cycle of the rank table.

The operation of the system will be better understood with reference to FIGS. 7 and 8. Table of FIG. 7 represents the rank value of the various characters of an alphabet. The number associated with each character represents in width units, the distance of this character on the matrix from the origin (line 40 of FIG. 2). In the example shown, it has been assumed that the *e* is repeated five times at five different positions having rank values 160, 320, 560, 760 and 960. The *t* has two rank values: 430 and 920. Other characters would as also be repeated, but two characters only have been chosen to illustrate the operation of the machine. FIG. 8 is a table showing that the line to compose is: "line of text." The width of each letter in units, is shown in column 146. Each letter of column 148 has an associated rank value shown in column 150, as accumulated width value shown in column 152 and a flash value shown in column 154. As explained in relation to FIG. 6, the first letter *l* has its width stored in storage 132 and its flash value in register 138 and storage 140, the comparison circuit allows free flow of information as this is the first character of the line and its rank value is necessarily greater than zero. When the next character *i* is entered, its width, five units, is added to the width of the *l* and the resulting sum, 10, (column 152) is stored in block 132. The rank value of this character which is 370 being inferior to the value stored in register 138, which is 570, gate 128 will remain closed until the rank table has been fully scanned once. At the second scanning a gate 128 will open and the only rank value of *i*, that is 360 will be processed so that the flash value of *i*, 370, will be stored in register 138 and storage 140. The next character of the line *n* will be directly processed as its rank value; 604, is superior to the flash value of the preceding character. At the time the next character of the line; *e* is entered the flash value of *n*, that is 660 is in register 138. Now the scanning of the rank table for the most appropriate rank value of *e* takes place. The first rank value coming out of the rank table is 160. As this is inferior to 660, it is discarded as are the next two rank values of *e* = 320 and 560, but the next rank value of the same character is 760 which is larger than 660. The comparison circuit 130 detecting this acceptable inequality opens gate 128 to allow the fourth character *e* of the alphabet to be entered into storage in the form of a flash value equal to 788. The processing of the line continues as explained and it can be seen from FIG. 8 that, because of the repetition of letters *e* (five times) and *t* (twice) five matrix scans will be enough to produce the full line rather than seven. It has been found experimentally, that, by using 220 character positions for a 90 character alphabets the most frequently used characters can be repeated a sufficient number of times to produce an average of 6 characters per matrix cycle in a machine of the kind described in U.S. Pat. No. 368,839. By using 6 galvanometers and projection units, it is possible to produce 36 characters per matrix cycle. In the case of a drum matrix rotating at 25 revolutions per second, it is thus possible to obtain 36 characters every 40 milliseconds or 54 characters (average book line) every 60 milliseconds. Allowing 65 milliseconds for interline film motion, the productivity of the machine can reach one book line every 125 milliseconds or 8 lines of approximately 63 characters or 504 characters per second.

I claim:

1. An improved photographic type composing machine comprising a continuously rotating matrix with characters, an optical system, a light sensitive surface to receive images of characters projected by the optical system, in which a matrix is illuminated by flashes of short duration at a predetermined time to project selected characters at the moment their images impinge on the photosensitive surface at the exact location of said characters in a line of text, wherein the improvement comprises a plurality of independent light projectors, light deflection means individually associated with said light projectors and control circuits to energize said illuminating and light deflection means whereby light projectors are positioned in advance to illuminate selected characters in a sequence which is independent of the sequence of characters in a line of text being composed.

2. An improved photographic type composing apparatus having, in combination, a photosensitive sheet, an optical system in position to focus an image upon the sheet, a support for a plurality of characters, means to move the support continuously relative to the optical system in a path causing the characters to pass successively and repeatedly through a projection zone where they are selectively illuminated at predetermined positions and projected through the optical system to form a line of text on the photosensitive surface wherein the improvement comprises a plurality of flash tubes each associated with an aperture and a deflectable mirror for positioning a light patch precisely in the projection zone at the point where the next character is to be projected from.

3. Type composing apparatus of the type comprising a character carrier, transparent characters carried on said character carrier, means to continuously move the characters on said character carrier through an elongated projection area, intermittent illumination means adapted to momentarily illuminate characters located in said projection area by forming patches of light slightly larger than the largest character to be illuminated, characterized in that: said light patches are positioned to expose a plurality of positions throughout the said elongated projection area by deflectable mirrors which are deflected by command from an electronic control circuit.

4. A photographic type composing machine as in claim 1 further characterized in that: the arrangement of characters on the continuously rotating matrix is such that the most frequently used characters in the alphabet are repeated a number of times proportional to the frequency of their occurrence in the language.